(12) United States Patent
Olari et al.

(10) Patent No.: US 7,073,244 B2
(45) Date of Patent: Jul. 11, 2006

(54) PROCESS FOR MACHINING A FLEXIBLE FOAM

(75) Inventors: John R. Olari, Walled Lake, MI (US); Donald L. Allen, Detroit, MI (US)

(73) Assignee: Lear Corporation, Southfield, MI (US)

( * ) Notice: Subject to any disclaimer, the term of this patent is extended or adjusted under 35 U.S.C. 154(b) by 152 days.

(21) Appl. No.: 10/251,506

(22) Filed: Sep. 20, 2002

(65) Prior Publication Data
US 2004/0089963 A1    May 13, 2004

(51) Int. Cl.
*B23C 5/25* (2006.01)
*B23Q 11/10* (2006.01)

(52) U.S. Cl. .................. 29/557; 409/132; 409/135

(58) Field of Classification Search ........... 409/131, 409/132, 136, 135; 29/557, 558; 264/28, 264/138, 139, 162
See application file for complete search history.

(56) References Cited

U.S. PATENT DOCUMENTS

| | | | |
|---|---|---|---|
| 4,573,833 A * | 3/1986 | Kondo | 409/136 |
| 4,718,153 A | 1/1988 | Armitage et al. | |
| 4,956,764 A | 9/1990 | Carver et al. | |
| 5,066,432 A * | 11/1991 | Gabathuler et al. | 264/28 |
| 5,253,579 A * | 10/1993 | Yoshii et al. | 409/135 |
| 5,518,806 A | 5/1996 | Eder et al. | |
| 5,847,961 A | 12/1998 | Jones et al. | |
| 5,859,405 A * | 1/1999 | Golz et al. | 82/51 |
| 5,962,089 A | 10/1999 | Jones et al. | |
| 5,968,614 A | 10/1999 | Reichenberger et al. | |
| 6,036,802 A | 3/2000 | Banks et al. | |
| 6,063,461 A * | 5/2000 | Hoyle et al. | 428/34.5 |
| 6,123,270 A * | 9/2000 | Hara | 408/56 |
| 6,263,938 B1 | 7/2001 | Maioli et al. | |
| 6,273,697 B1 * | 8/2001 | Harfmann | 425/4 C |
| 6,287,058 B1 * | 9/2001 | Arai et al. | 409/132 |
| 6,382,886 B1 * | 5/2002 | Jaeger | 409/131 |
| 6,666,630 B1 * | 12/2003 | Zimmermann et al. | 409/132 |
| 6,715,971 B1 * | 4/2004 | Curtis | 409/136 |
| 2002/0052425 A1 * | 5/2002 | Kaku et al. | 521/137 |

FOREIGN PATENT DOCUMENTS

EP    1006133 A1 *  6/2000

* cited by examiner

*Primary Examiner*—Boyer D. Ashley
*Assistant Examiner*—Dana Ross
(74) *Attorney, Agent, or Firm*—MacMillan, Sobanski & Todd, LLC

(57) ABSTRACT

The invention relates to a process for machining a flexible foam. The flexible foam is treated to temporarily harden the foam. The hardened foam is machined. The foam is then returned to its original flexible state.

9 Claims, 2 Drawing Sheets

PROCESS FOR MACHINING A FLEXIBLE FOAM

BACKGROUND OF THE INVENTION

This invention relates in general to machining processes, and in particular to a process for machining a flexible foam.

Flexible foams such as polyurethane foams are used in many different commercial applications. In a typical application the flexible foams are used for padding. For example, the flexible foams can be formed into the shape of foam pads for vehicle seats.

Flexible foams are usually molded into a desired shape. However, in some situations it would be advantageous to be able to machine a flexible foam to create a desired shape, for example, to produce prototype foam pads for vehicle seats. Unfortunately, a flexible foam such as a polyurethane foam is very difficult to machine due to its flexible nature. The cutting tools of conventional automated cutting equipment catch and tear the foam instead of cutting it. As a result, it is a common practice to cut the flexible foam by hand instead of using automated equipment such as a CNC milling machine, even when CADD data is available to produce cutter paths for the automated equipment. Cutting by hand is slower and not as accurate as cutting with automated equipment.

U.S. Pat. No. 6,273,697 B1 to Harfmann, issued Aug. 14, 2001, discloses a process for forming a low-density polymer foam article in which a blowing agent and a resin are combined to form a mixture, and the mixture is cooled to a temperature approaching its freezing point and then extruded. The extruded foam is then cooled by direct contact with a cooling surface. In the embodiment shown in FIG. 1, a knife is used to slit the foam to create a sheet, which is then wound into rolls. There is no suggestion in this patent to start with a flexible foam, and then to treat the flexible foam to temporarily harden it before cutting. The patent discloses a rigid foam used to make an article such as a food container, not a flexible foam adapted for use as padding or the like. Moreover, the disclosed process cools the foam to condense the blowing agent, not to harden the foam to make it easier to cut.

SUMMARY OF THE INVENTION

This invention relates to a process for machining a flexible foam. The flexible foam is treated to temporarily harden the foam. In a preferred embodiment, the flexible foam is treated by cooling the flexible foam, such as by applying a liquefied gas to the flexible foam, or by soaking the flexible foam with water and then freezing the water. The hardened foam is machined such as by cutting it into a desired shape. The foam is then returned to its original flexible state.

Various objects and advantages of this invention will become apparent to those skilled in the art from the following detailed description of the preferred embodiments, when read in light of the accompanying drawings.

DETAILED DESCRIPTION OF THE PREFERRED EMBODIMENT

Figure 1:
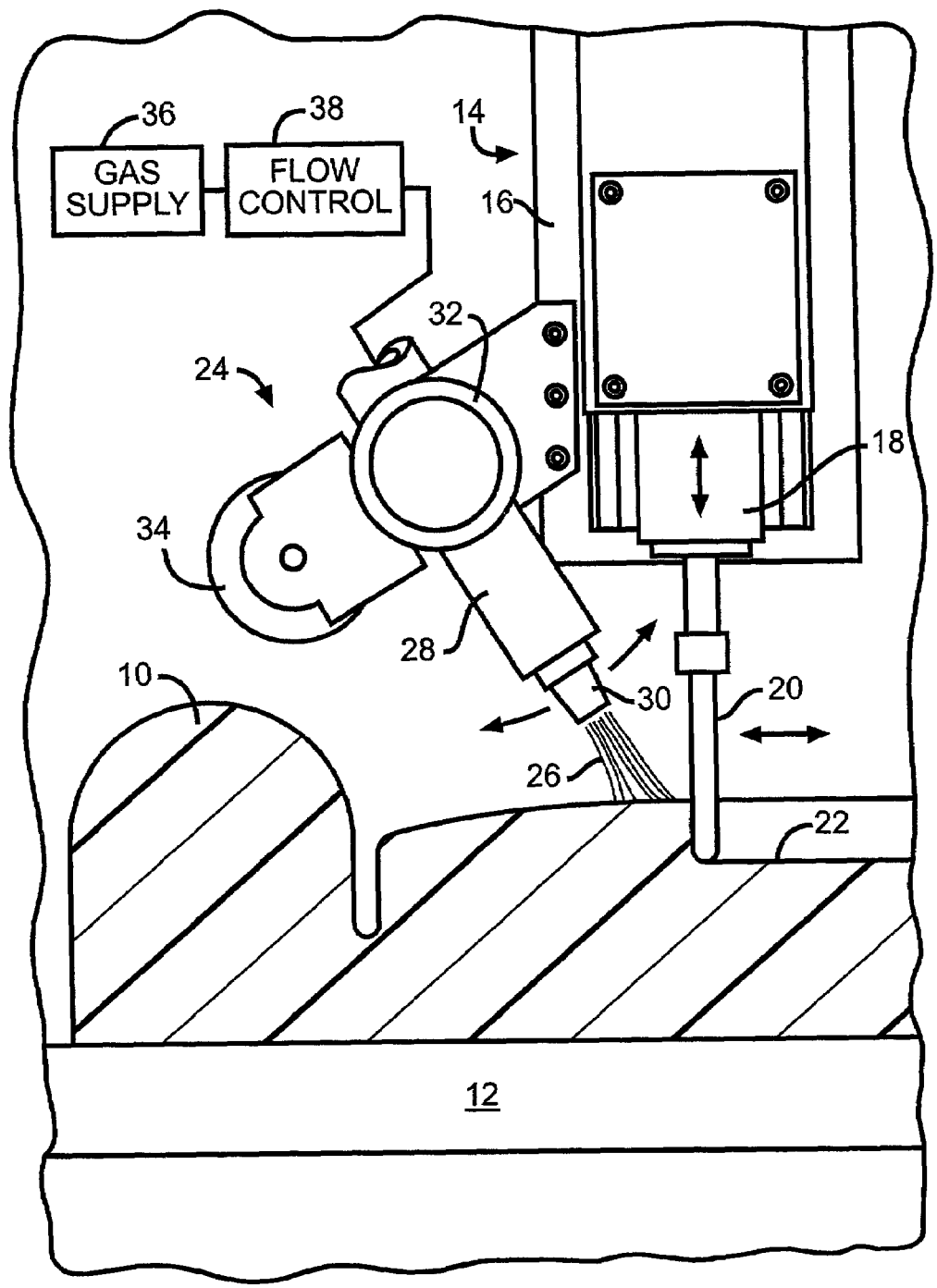
FIG. 1 is a side elevational view, partly in cross-section, showing a flexible foam being cooled to temporarily harden the foam, and a cutting blade of an automated cutting equipment cutting the hardened foam.

The process of the invention overcomes the previous difficulties in machining flexible foams. The process allows the cutting tools of conventional automated cutting equipment to cleanly cut the flexible foams instead of catching and tearing the foams. The use of automated equipment such as a CNC machine will significantly increase the speed and accuracy of producing articles such as prototype foam pads for vehicle seats.

The process can be used to machine any type of flexible foam. By "flexible" is meant a foam which is soft and easily bendable, stretchable and compressible by hand. The invention is not intended to apply to a rigid foam such as a polystyrene foam or the rigid polymer foams disclosed in the above-described Harfmann patent. The foam is flexible at room temperature (72° F.). The foam is generally a low- or medium-density, open-celled foam. In a preferred embodiment, the flexible foam is a polyurethane foam.

The flexible foam is treated to temporarily harden the foam. Any suitable method can be used to harden the foam such that it can be machined with a conventional machining tool such as a cutting tool. The entire foam piece can be hardened, or just the portion of the foam in the path of the machining tool can be hardened. Preferably, the flexible foam is treated by cooling the flexible foam in order to temporarily harden the foam. The flexible foam is preferably cooled to a temperature of about 32° F. or below.

In one embodiment of the invention, the flexible foam is cooled by soaking the foam with a liquid and then freezing the liquid. Typically, the liquid used is water, although other liquids having freezing points within a practicable range can also be used. The flexible foam can be soaked with the liquid in any suitable manner, such as by pouring or spraying the liquid onto the foam until the foam is completely soaked, or by immersing the foam in a container of the liquid. Preferably, the size and shape of the container are similar to that of the foam piece, and the foam is removed from the container for machining after freezing the liquid. The liquid can be frozen by cooling in any suitable manner.

In another embodiment of the invention, the flexible foam is cooled by applying a liquefied gas to the flexible foam. As the liquefied gas evaporates, it cools and hardens the foam. Any suitable liquefied gas can be used, such as liquid nitrogen or liquid carbon dioxide. The liquefied gas can be applied to the flexible foam in any suitable manner, such as by pouring, spraying or immersion. Typically, the liquefied gas is applied by spraying. In one embodiment, the liquefied gas is applied only to the portion of the flexible foam that is in the path of the machining tool.

The foam is machined after it has been temporarily hardened. Any suitable machining equipment can be used, such as cutting, milling or drilling equipment. Preferably, the hardened foam is cut using automated cutting equipment, and more preferably using a CNC machine.

Figure 2:
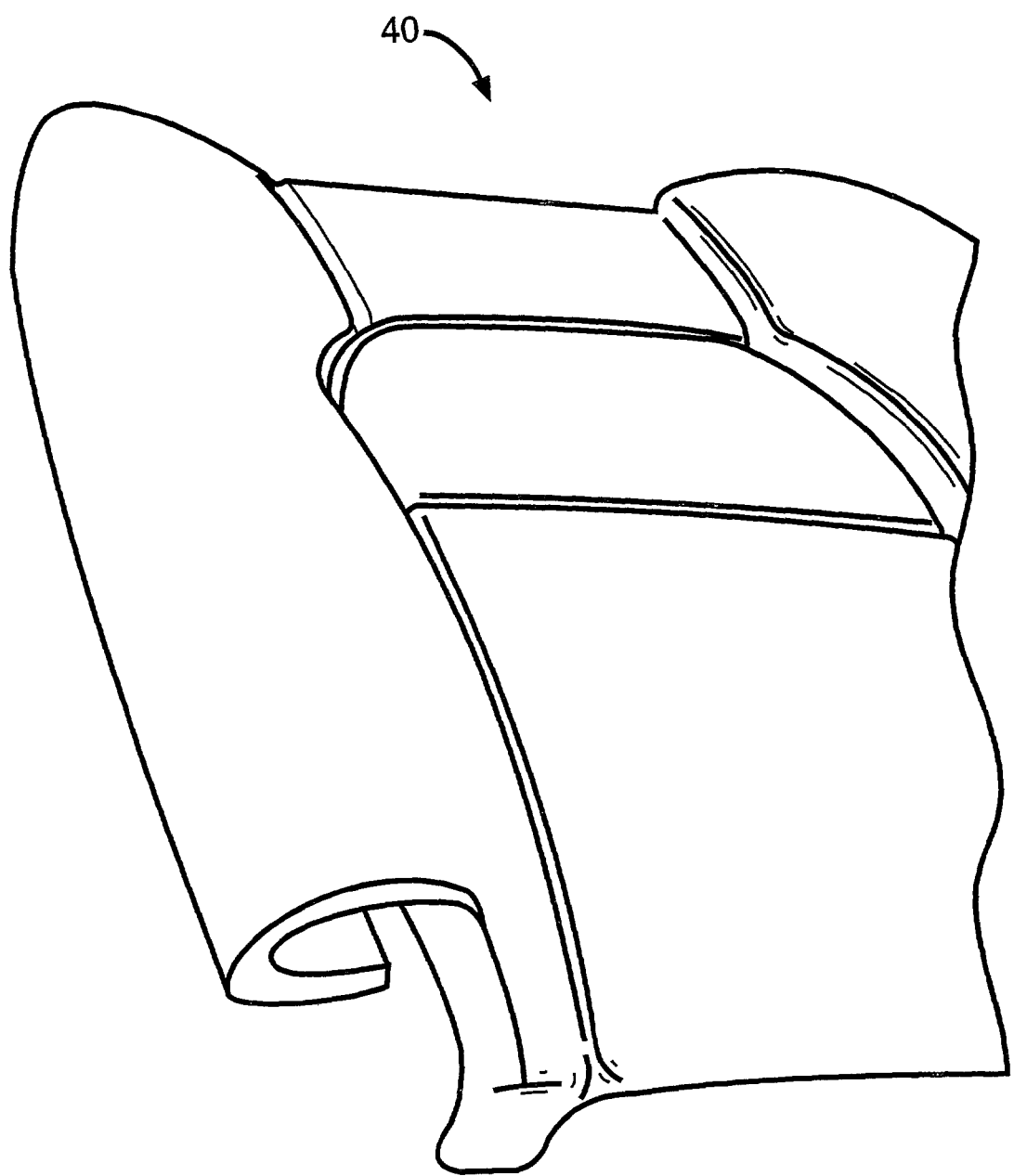
FIG. 2 is a perspective view of a foam pad for a vehicle seat that can be produced using the process of the invention.

FIG. 1 shows a process for machining a flexible foam according to the invention. A flexible foam 10 is positioned on the bed 12 of an automated cutting machine. The cutting tool 14 of the machine includes a housing 16, a cutting head 18 mounted in the housing 16, and a cutting blade 20 attached to the end of the cutting head 18. The cutting head 18 moves up and down so that the cutting blade 20 cuts the flexible foam 10. The housing 16 can move in any direction laterally relative to the flexible foam 10 to allow the cutting blade 20 to cut a desired path in the foam. In the drawing, the housing 16 and cutting blade 20 are shown moving to the left to cut a path 22 in the foam 10. A spraying apparatus 24 is mounted on the housing 16 for spraying a liquefied gas 26 on the flexible foam 10. The liquefied gas 26 temporarily hardens the foam 10 so that it can be easily cut with the cutting blade 20. The spraying apparatus 24 includes a spraying head 28, and a nozzle 30 on the end of the spraying head 28 through which the liquefied gas 26 is sprayed. The spraying apparatus 24 also includes a first motor 32 that causes the spraying head 28 to rotate clockwise or counterclockwise, and a second motor 34 that causes the spraying head 28 to move in or out of the plane of the drawing. The motors 32 and 34 allow the spraying head 28 to be positioned to spray the liquefied gas 26 in the path of the cutting blade 20 even when the blade changes directions. The spraying apparatus 24 includes a gas supply 36 and a flow control mechanism 38. Although a specific apparatus is shown in the drawing, it is understand that any suitable apparatus can be used in the process. FIG. 2 shows a foam pad 40 for a vehicle seat that can be produced using the process of the invention.

After the foam has been machined, the foam is allowed or caused to return to its original flexible state. This typically involves applying heat to the foam or allowing the foam to heat slowly at room temperature. The foam can be dried if necessary.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A process for performing an operation on a workpiece comprising the steps of:
   a. providing a workpiece;
   b. hardening a portion of the workpieces the portion being less than the whole workpiece; and
   c. subsequently to step (b) performing an operation on the hardened portion of the workpiece;
   wherein said step (b) is performed by spraying a liquefied gas from a nozzle onto the portion of the workpiece;
   wherein said step (c) is performed by using a tool to perform the operation on the hardened portion of the workpiece;
   wherein said steps (b) and (c) are performed by supporting the nozzle on the tool for relative movement thereto.

2. The process of claim 1, wherein said step (a) is performed by providing a foam pad of a seat.

3. The process of claim 1, wherein said step (b) is performed by cooling the portion of the workpiece.

4. The process of claim 3, wherein said step (b) is performed by spraying a liquefied gas onto the portion of the workpiece.

5. The process of claim 1, wherein said step (c) is performed by moving the tool relative to the workpiece to cut a path in the workpiece, and wherein said step (b) is performed by spraying the liquefied gas in front of the tool as the tool moves relative to the workpiece.

6. The process of claim 1, wherein said step (c) is performed by removing material from the hardened portion of the workpiece.

7. The process of claim 1, wherein said workpiece is a foam pad for a vehicle seat.

8. A process for performing an operation on a workpiece comprising the steps of:
   a. providing a workpiece:
   b. hardening a portion of the workpiece, the portion being less than the whole workpiece; and
   c. subsequently to step (b) performing an operation on the hardened portion of the workpiece;
   wherein said step (b) is performed by spraying a liquefied gas from a nozzle onto the portion of the workpiece;
   wherein said step (c) is performed by using a tool to perform the operation on the hardened portion of the workpiece;
   wherein said steps (b) and (c) are performed by supporting the nozzle on the tool for movement;
   wherein said step (c) is performed by changing direction of the tool along the path, and wherein said step (b) is performed by moving the nozzle relative to the tool such that the position of the spray of liquefied gas can be changed relative to the tool when the tool changes direction.

9. The process of claim 8, wherein said steps (b) and (c) are performed by supporting the nozzle on the tool for relative movement thereto.

* * * * *